US007272550B2

(12) United States Patent
Chen et al.

(10) Patent No.: US 7,272,550 B2
(45) Date of Patent: Sep. 18, 2007

(54) SYSTEM AND METHOD FOR CONFIGURABLE BINDING OF ACCESS CONTROL LISTS IN A CONTENT MANAGEMENT SYSTEM

(75) Inventors: An Feng-I Chen, Fremont, CA (US); Tawei Hu, San Jose, CA (US); Lily Liang, San Jose, CA (US); Jy-Jine James Lin, Cupertino, CA (US); Edward Joseph Perry, Cary, NC (US); Yuping Wang, San Jose, CA (US); Alan Tsu-I Yaung, San Jose, CA (US); Howard Hao Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 10/131,634

(22) Filed: Apr. 23, 2002

(65) Prior Publication Data

US 2003/0200443 A1    Oct. 23, 2003

(51) Int. Cl.
*G06F 9/455*   (2006.01)
*G06F 7/00*    (2006.01)
*G06F 15/173*  (2006.01)

(52) U.S. Cl. .................... 703/27; 709/225; 395/614; 395/701; 395/600; 395/187; 707/101; 713/200; 713/201

(58) Field of Classification Search .................... 726/1, 726/4; 713/200, 201
See application file for complete search history.

(56) References Cited

U.S. PATENT DOCUMENTS 5,390,312 A    2/1995   Chairot et al. .............. 395/400
5,495,533 A    2/1996   Linehan et al. ............. 713/155
5,504,892 A *  4/1996   Atsatt et al. ............ 707/103 R
5,552,776 A    9/1996   Wade et al. ................ 340/5.74
5,560,005 A    9/1996   Hoover et al. .............. 395/600
5,627,987 A    5/1997   Nozue et al. ............... 395/410
5,649,099 A *  7/1997   Theimer et al. ................ 726/4

(Continued)

FOREIGN PATENT DOCUMENTS

WO    WO9940502    8/1999

OTHER PUBLICATIONS

Sandhu et al. 'NetWare 4 as an Example of Role-Based Access Control'. ACM Press, 1996.*

(Continued)

*Primary Examiner*—Fred Ferris
*Assistant Examiner*—Shambhavi Patel
(74) *Attorney, Agent, or Firm*—Shelley M Beckstrand

(57) ABSTRACT

A system and method for authorizing access to a controlled entity by a user. A set of user privileges is provided for user; and a content manager intersects an access control list (ACL) and the set of user privileges to authorize access. Binding level control indicia selectively binds an access control list (ACL) to the controlled entity at item type, item, mixed, or library binding level. An item type comprises one or more component items with each component item having one or more item views which together form an item type view. A content manager is responsive to the binding level to perform ACL checking for authorizing access to the controlled entity by the user.

4 Claims, 7 Drawing Sheets

U.S. PATENT DOCUMENTS

| | | | | |
|---|---|---|---|---|
| 5,701,458 | A | * | 12/1997 | Bsaibes et al. ............... 707/9 |
| 5,758,153 | A | * | 5/1998 | Atsatt et al. ............ 707/103 R |
| 5,774,668 | A | | 6/1998 | Choquier et al. ...... 395/200.53 |
| 5,778,222 | A | * | 7/1998 | Herrick et al. ................ 707/9 |
| 5,941,947 | A | * | 8/1999 | Brown et al. ............... 709/225 |
| 6,014,666 | A | | 1/2000 | Helland et al. ................ 707/9 |
| 6,052,785 | A | | 4/2000 | Lin et al. ....................... 726/5 |
| 6,105,027 | A | | 8/2000 | Schneider ...................... 707/9 |
| 6,141,754 | A | * | 10/2000 | Choy ............................ 726/1 |
| 6,161,139 | A | | 12/2000 | Win et al. ................... 709/225 |
| 6,195,705 | B1 | | 2/2001 | Leung ........................ 709/245 |
| 6,256,715 | B1 | | 7/2001 | Hansen ....................... 711/163 |
| 6,308,173 | B1 | | 10/2001 | Glasser et al. ................. 707/9 |
| 6,438,549 | B1 | | 8/2002 | Aldred et al. .................. 707/9 |
| 6,460,141 | B1 | | 10/2002 | Olden .......................... 726/4 |
| 6,470,353 | B1 | | 10/2002 | Yaung et al. .......... 707/103 R |
| 6,523,027 | B1 | | 2/2003 | Underwood ................... 707/4 |
| 6,581,060 | B1 | | 6/2003 | Choy ............................ 707/9 |
| 6,609,128 | B1 | | 8/2003 | Underwood ................ 707/10 |
| 6,633,878 | B1 | | 10/2003 | Underwood ............... 707/100 |
| 6,718,535 | B1 | | 4/2004 | Underwood ............... 717/101 |
| 6,772,350 | B1 | | 8/2004 | Belani et al. ............... 713/202 |
| 6,823,338 | B1 | | 11/2004 | Byrne et al. ................... 707/9 |
| 6,823,452 | B1 | | 11/2004 | Doyle et al. ................ 713/156 |
| 6,976,023 | B2 | | 12/2005 | Chen et al. ..................... 707/9 |
| 7,016,907 | B2 | * | 3/2006 | Boreham et al. ........... 707/101 |
| 2001/0037379 | A1 | | 11/2001 | Livnat ........................ 709/219 |

OTHER PUBLICATIONS

Swfit et al. 'Improving the Granularity of Access Control in Windows NT.' ACM Workshop on Role Based Access Control. May 2001.*

H.M. Gladney. "Access Control for Large Collections." ACM Transactions on Information Systems, vol. 15, No. 2. Apr. 1997, pp. 154-157.*

Abadi et al. 'A Calculus for Access Control in Distributed Systems.' ACM Transactions on Programming Languages and Systems, vol. 15, No. 4, Sep. 1993, pp. 706-734.*

*IBM Content Manager for Multiplatforms System Administration Guide.* First Edition (Jan. 2001), IBM Doc. No. SC27-0868-00.

Crall, Chris et al. *Authorization in Enterprise-wide Distributed System A Practical Design and Application.* Proceedings 14th Annual Computer Security Applications Conference. Los Alamitos, CA: IEEE Comput. Soc., 1998. 12 pages.

Kavaln, Vasanthi et al. *A Mobile Agent for Asynchronous Administration of Multiple DBMS Servers.* Proceedings of the IEEE Third International Workshop on systems Management. Los Alamitos, CA: IEEE Compt. Soc., 1998. 1-2.

Hayton, Richard et al. *An Open Architecture for Secure Interworking Services.* Proceedings of the 17th International Conference on Distributed Computing Systems, Los Alamitos, CA: IEEE Comput. Soc. Press, 1997. 315-321.

Han, Yan et al. *Constraint Specification for Object Model of Access Control Based on Role.* Software Engineering Notes, vol. 25, No. 2, Mar. 2000. USA: ACM. 60-64. [Inspec Abstract AN 6580279, ABN C2000-06-6130S-023].

IBM Corp. Content Manager for Multiplatforms. Wysiwyg://2/ http://www-4.ibm.com/software/data/cm/cmgr/mp/about.html; and Wysiwyg://1/http://www-4.ibm.com/software/data/cm/cmgr/mp [accessed Mar. 26, 2002 5:13 PM].

Okamoto, Tatsuaki. *A Single Public-Key Authentication Scheme for Multiple Users.* Systems and Computer in Japan, vol. 18, No. 10, 1987.

Thesaurus.com, Refresh (Synonyms), pp. 1-4 <URL:http://thesaurus.reference.com/browse/refresh> retrieved online Jul. 27, 2006.

Dictionary.com, Refresh (Definition), pp. 1-3 <URL:http//dictionary.reference.com/browse/refresh> retrieved online Jul. 27, 2006.

Dictionary.com, Update (Definition), pp. 1-2 <URL://dictionary.reference.com/browse/update> retrieved online Jul. 27, 2006.

Dictionary.com, Incremental (Definition), pp. 1-2 <URL:http://dictionary.reference.com/browse/incremental> retrieved online Jul. 27, 2006.

Dictionary.com, Retrieved online <URL:http//dictionary.reference.com/search?q=compile>, Compile, definition of. Mar. 30, 2006.

*System and Method for RDBMS to Protect Records in Accoreance with Non-RDBMS Rules.* IBM Docket No. AM9-99-0207; U.S. Appl. No. S/N 09/686,487 (pending).

* cited by examiner

| SYSTEM CONTROL TABLE | | | | | |
|---|---|---|---|---|---|
| DATABASE NAME | ACL BINDING LEVEL | LIBRARY ACL CODE | PUBLIC ACCESS ENABLED | ALLOW TRUSTED LOGON | |
| \102 | \104 | \106 | \108 | \105 | |

FIG. 3

| USERS TABLE | | | | | | |
|---|---|---|---|---|---|---|
| USER ID | USER KIND | USER PRIVILEGE SET CODE | GRANT PRIVILEGE SET CODE | DEFAULT ACL CODE | PASSWORD | USER NAME |
| \130 | \140 | \142 | \146 | \148 | \156 | \152 |

FIG. 4

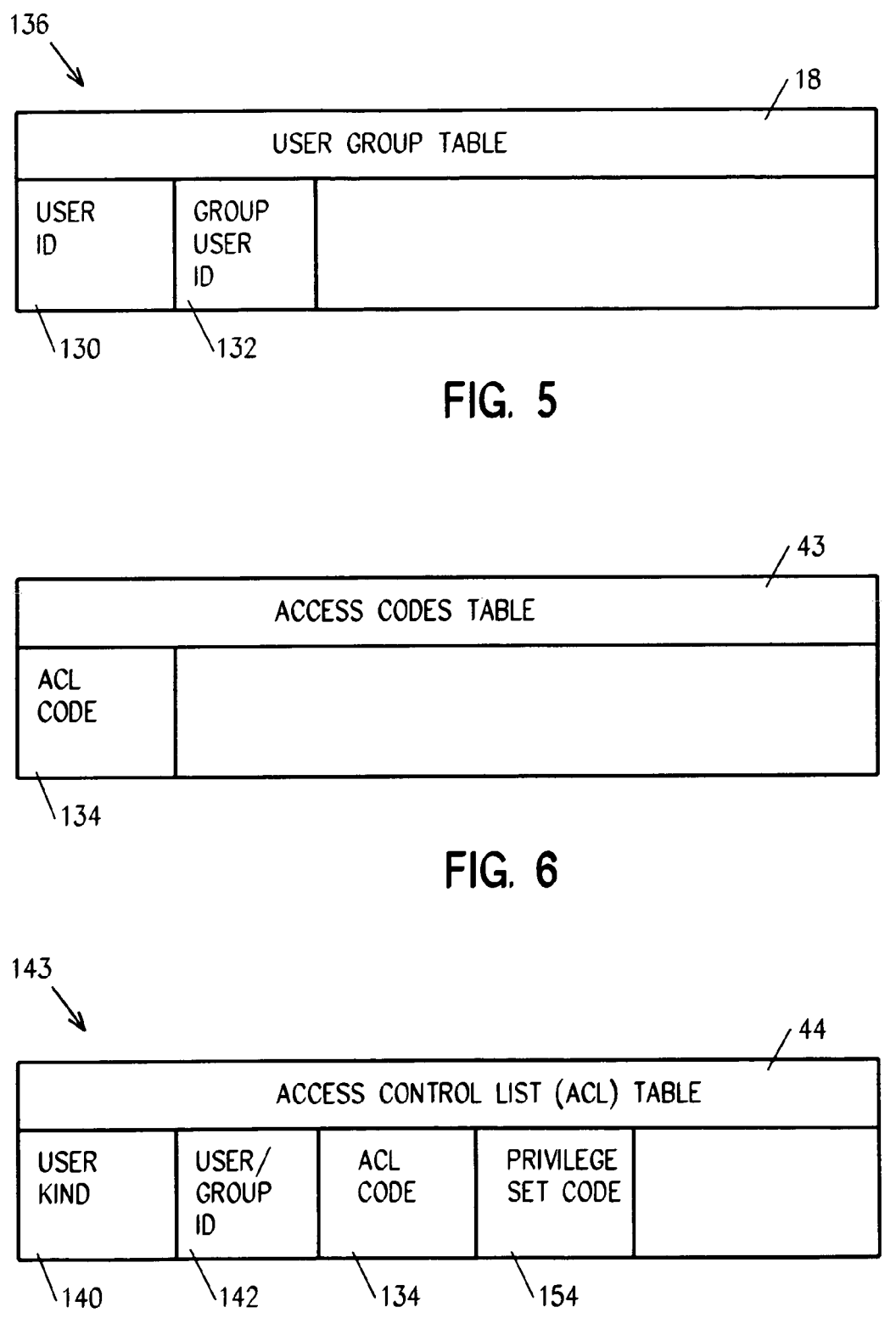

USER GROUP TABLE /18

| USER ID | GROUP USER ID | |
|---|---|---|
| \130 | \132 | |

ACCESS CODES TABLE /43

| ACL CODE | |
|---|---|
| \134 | |

FIG. 6

ACCESS CONTROL LIST (ACL) TABLE /44

| USER KIND | USER/ GROUP ID | ACL CODE | PRIVILEGE SET CODE | |
|---|---|---|---|---|
| \140 | \142 | \134 | \154 | |

SYSTEM AND METHOD FOR CONFIGURABLE BINDING OF ACCESS CONTROL LISTS IN A CONTENT MANAGEMENT SYSTEM

CROSS REFERENCES TO RELATED APPLICATIONS

U.S. Patent No. 6,976,023, entitled "SYSTEM AND METHOD FOR MANAGING APPLICATION SPECIFIC PRIVILEGES IN A CONTENT MANAGEMENT SYSTEM", Ser. No. 10/131,008, entitled "SYSTEM AND METHOD FOR ENSURING SECURITY WITH MULTIPLE AUTHENTICATION SCHEMES", and Ser. No. 10/131,659, entitled "SYSTEM AND METHOD FOR INCREMENTAL REFRESH OF A COMPILED ACCESS CONTROL TABLE IN A CONTENT MANAGEMENT SYSTEM" filed concurrently herewith are assigned to the same assignee hereof and contain subject matter related, in certain respect, to the subject matter of the present application. The above identified patent applications are incorporated herein by reference.

BACKGROUND OF THE INVENTION

1. Technical Field of the Invention

This invention relates to a system and method for managing a database. More particularly, to the configurable binding of controlled entities to access control lists.

2. Background Art

Access control is an important element in a content management system. An access control list (ACL) is used to determine who can access an entity and what operations can be performed on that entity.

IBM Content Manager Version 7 (CM V7) allows an ACL to be associated with either an item or an index class (a table of multiple items with the same attributes). The resolution of access control is based on the entity and the operation. It does not provide the flexibility that allows the resolution to be made at either the item level or the index class level. In addition, with respect to consistency, the ACL of the index class may allow a user to retrieve the items in the index class, but ACL of the item may not allow the user to access the content.

There is, therefore, a need in the art for a system and method for providing configurable binding of ACLs for an item and an item type (a group of tables containing items with same attributes) in order to improve flexibility and consistency on access control resolution.

It is an object of the invention to provide an improved system and method for managing access to entities.

SUMMARY OF THE INVENTION

A system and method for authorizing access to a controlled entity by a user by binding an access control list (ACL) to the controlled entity selectively at item type, item, mixed, or library level. A set of user privileges is provided for each user, and that set is intersected with the ACL to authorize access to the controlled entity.

Other features and advantages of this invention will become apparent from the following detailed description of the presently preferred embodiment of the invention, taken in conjunction with the accompanying drawings.

BRIEF DESCRIPTION OF THE DRAWINGS

FIG. 3 illustrates the system control table 31 of FIG. 2.

FIG. 4 illustrates the user table 16 of FIG. 2.

FIG. 5 illustrates the user group table 18 of FIG. 2.

FIG. 6 illustrates the access codes table of FIG. 2.

FIG. 7 illustrates the access control list (ACL) table 44 of FIGS. 1 and 2.

DETAILED DESCRIPTION OF PREFERRED EMBODIMENTS

Figure 1:
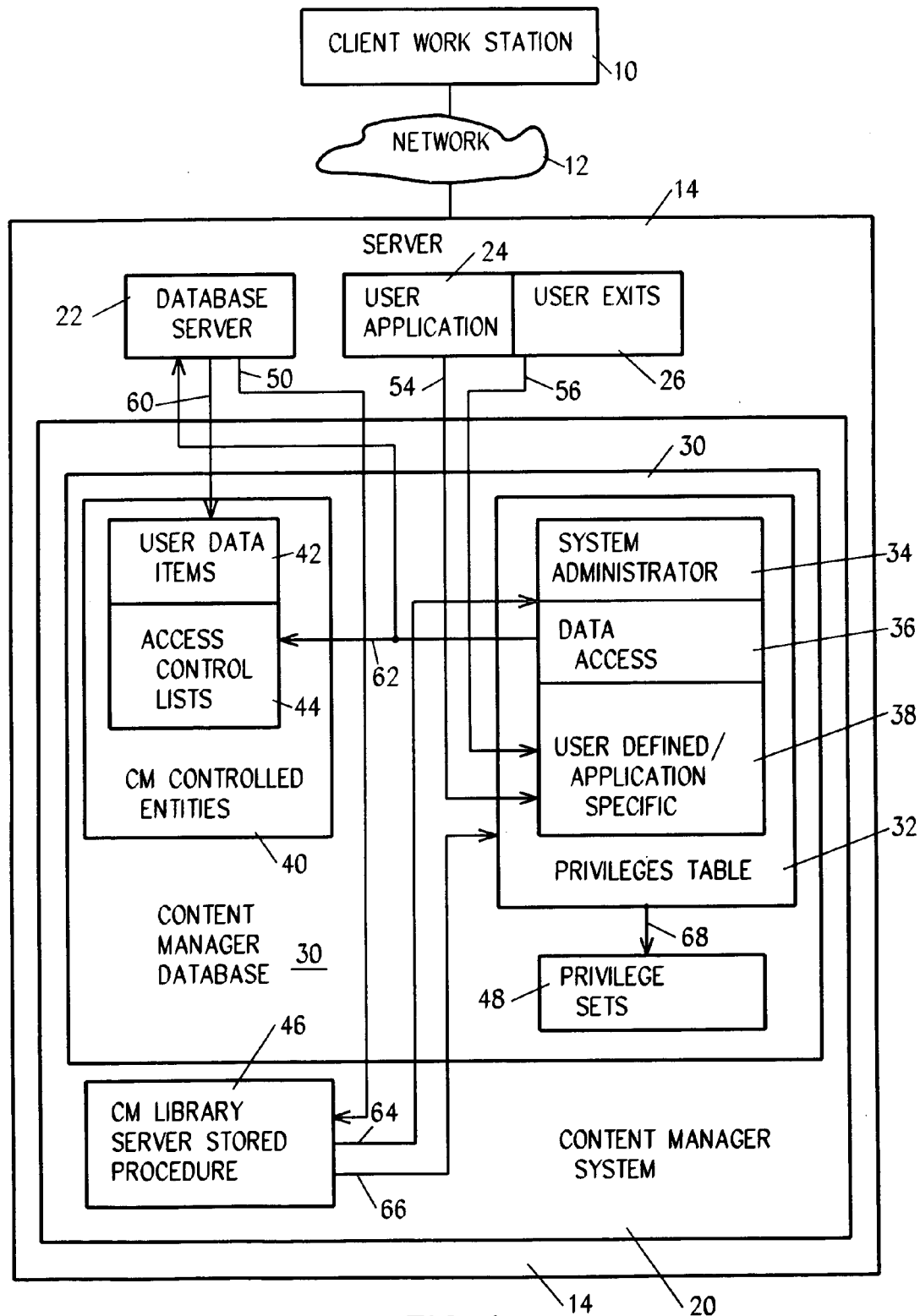
FIG. 1 is a high level diagram illustrating basic components of an exemplary embodiment of the system of the invention.

Referring to FIG. 1, in an exemplary embodiment of the system of the invention, a user at a client workstation 10 is connected through network 12 to a server 14 which includes a content manager system 20, a database server 22, user applications 24 and exits 26. Content manager system 20 includes content manager database 30 and stored procedures 46, which procedures 46, among other things, define the methods and tasks executed by content manager system 20 with respect to the tables of database 30. System database 30 includes content manager controlled entities 40, a privileges table 32, privileges sets 48, and several other tables including those shown in FIG. 2.

Figure 2:
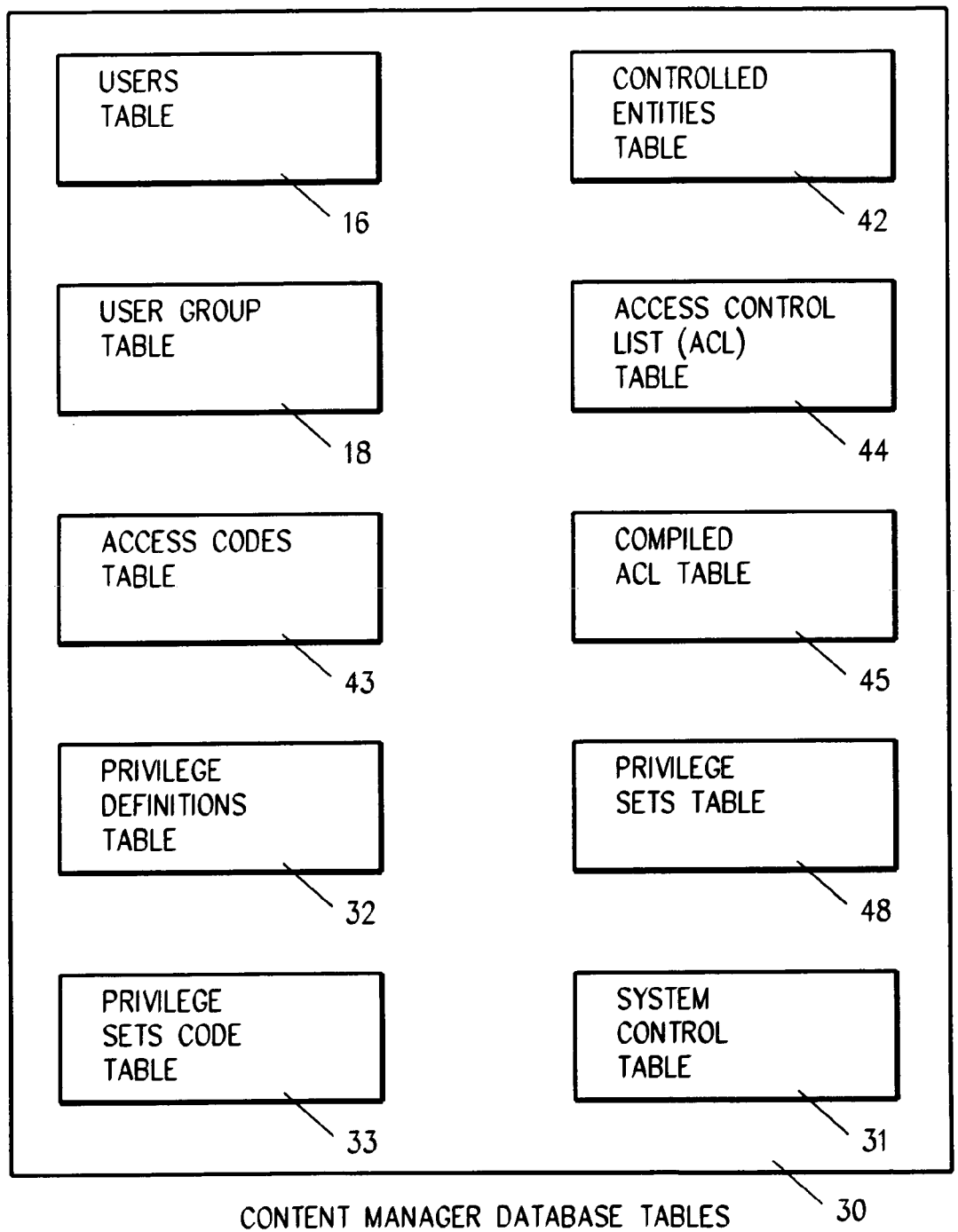
FIG. 2 is a high level diagram illustrating various tables for implementing a preferred embodiment of the system of the invention.
Figure 13:
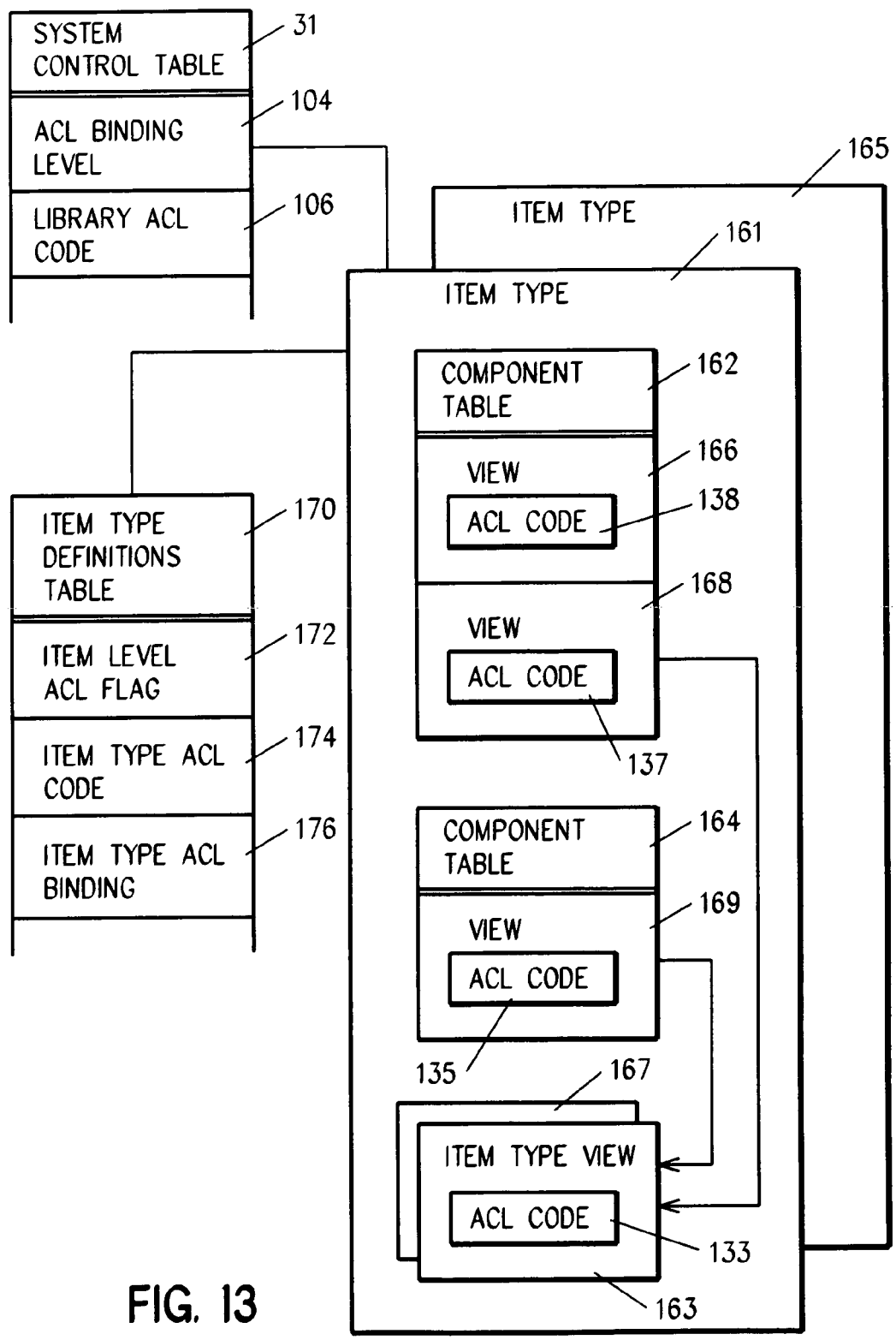
FIG. 13 illustrates item types and the item type definition table in accordance with the preferred embodiment of the invention.

Referring to FIGS. 2 and 13, access to entity 42 is managed through the use of several tables, including in this preferred embodiment of the invention users table 16, user groups table 18, access codes table 43, privilege definitions table 32, privilege sets code table 33, access control list (ACL) table 44, compiled ACL table 45, system control table 31 and privilege sets table 48.

Referring to FIG. 3, system control table 31 stores system configuration parameters for CM library server 20. Columns of table 31 include database name 102, ACL binding level 104, library ACL code 106, and public access enabled flag 108. Database name 102, an installation parameter, is the name of the library server 22. ACL binding level 104 is the access control level having, as valid values, 0 at item type level (default), 1 at item level, 2 at mixed item and item type level, and 3 at entire library level. Library ACL code 106 contains the ACL to be associated with all CM item types and items 40 if the parameter ACL binding level 104 is configured at library level. Public access enabled flag 108 indicates whether the capability of opening a bound entity public to public is enabled. When this column 108 is updated, system 20 rebuilds compiled ACL tables 45 and recreates all database table 30 views.

Referring to FIG. 4, users table 16 maintains a catalog of individual users and user groups 141. Individual users 141 can belong to none or any number of groups. Users must be assigned a number of privileges, stored in user privilege set code table 33. Defining new CM users 136 does not guarantee their existence in the data base management system (DBMS) and the operating system. The system administrator ensures the usefulness of the CM users 141 he creates. A group is a number of zero or more users 141, usually with the same job description, and assigned the same privilege set 158. A group 136 cannot belong to other groups. A group 136 does not hold default privileges for its members, nor do they relate to data base management system (DBMS) or operating system groups. Defining groups 136 minimizes the effort required to administer ACLs 143.

User table 16 columns include user ID 130, user kind 140, user privilege set code 142, grant privilege set code 146, default ACL code 148, password 156, and user name 152. User ID 130 is the ID of the individual user or group. For an individual user 141, user ID 130 should match his DBMS user ID. The CM 20 uses this value for user authentication and access control. For a group 141, user ID 130 contains the group name. User kind 140 indicates whether this entry 141 represents an individual user or a group. User privilege set code 142 denotes the user privileges for this user 141. The privilege set 158 must be defined first, and this value is not valid for groups. It is set to 1 by CM system 20 for groups. User privilege set code 142 may be updated. Grant privilege set code 146 is the code assigned to new users 141 by a user 141 who is authorized to create users but not grant privileges to the new users. This value 146 is not valid for groups, and it can be updated. A system administrator GUI for creating a user 141 must have an entry field for that user's grant privilege set code 146. Default ACL code 148 is used to associate with items 42 when the access control 104 is configured at item level if this user 141 does not provide an ACL code when he creates items 42. Password 156 is the encrypted user password. User name 152 is the full name of this user or group 141.

Referring to FIG. 5, users group table 18 maintains associations of individual users 141 with groups 136. The columns of table 18 are user ID 130 and group user ID 132. An individual user 141 can belong to none or any number of groups 141. A group 141 cannot belong to other groups. When an individual user 141 is associated with a group 141, the user is said to be a member of that group. Associating individual users with groups in user group table 18 by a row 136 having a user ID 130 associated with a group ID 132 simplifies access control management. When defining access control specifications 143, a group 141 can be granted a number of privileges instead of granting the same set of privileges 158 to each user 141 in the group. The individual user 141 and the group 141 must be defined in the users table 16 before an association in user group table 18 can be made between the user ID 130 and the group ID 132. Rows in this table can only be deleted, not updated.

Referring to FIG. 6, access codes table 43 maintains the access control list identifiers 134. Each list 143 is uniquely identified by the access list code 134 which is generated by CM system and cannot be updated. The list specifications are stored in the access control list table 44. ACL name and description are defined in a separate keywords table (not shown). Table I sets forth an exemplary list of pre-configured ACL codes 134.

TABLE I

CM Pre-configured ACL Codes

| ACLCode 134 | ACLName* | ACLDesc* |
|---|---|---|
| 1 | SuperUserACL | ACL allows CM pre-configured user ICMADMIN to perform all CM functions on the bound entities 40. |
| 2 | NoAccessACL | ACL specifies, for all CM users, no actions are allowed on the bound entities 40. |
| 3 | PublicReadACL | ACL allows all CM users to read the bound entities 40. |

*For illustration only. Name and description are defined in a keywords table (not shown).

Referring to FIG. 7, access control list (ACL) table 44 maintains the access control list specifications. The columns of table 44 include user kind 140, user/group ID 142, ACL code 134, and privilege set code 154. ACL code 134 is the ID of an access control list. Access control lists are used by the access control algorithm to determine a user's access rights for an item 44. User ID 142 contains the ID 130 for an individual user 141 or for a group 141. User kind 140 interprets the User ID column 130 as public, group, or individual. If user kind 140 is public, the value in user ID column 130 is ignored. Privilege set code 154 is the Privilege Set 158 identifier, which indicates the operations allowed for the bound item 42. A list may contain more than one control 143, and comprises all rows 143 having the same ACL code 134. Each control 143 is composed of two elements: who (user ID 142, user kind 140) can perform what (privilege set code 154). Each CM data entity (Item) 42 must be bound to a control list in table 44. The control specifications 143 then will be enforced when items 42 are accessed. Table II is an exemplary list of pre-configured access control lists.

TABLE II

Pre-configured Access Control Lists

| ACLCode 134 | UserID 142 | UserKind 140 | PrivSetCode 154 |
|---|---|---|---|
| 1 (SuperUserACL) | ICMADMIN | 0 | 1 (AllPrivSet) |
| 3 (PublicReadACL) | ICMPUBLC | 2 (public) | 6 (ItemReadPrivSet) |

Figure 8:
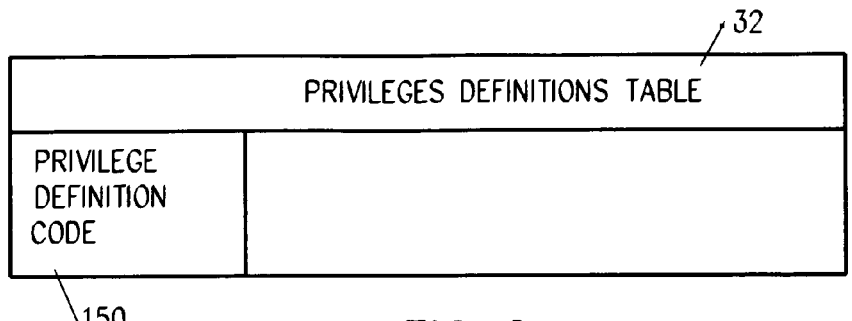
FIG. 8 illustrates the privileges definitions table of FIG. 2.

Referring to FIG. 8, privileges definitions table 32 maintains an unlimited number of CM privilege definitions, including both CM system defined privilege definitions 34, 36 and user defined privileges 38. System defined privileges 34, 36 cannot be modified. Each privilege has a system 20 generated unique privilege definition code 150 as a primary key. Codes 0 to 999 are reserved to store CM system 20 defined privileges 34, 36. 1000 and up are open for user defined privileges 38. When defining or updating privilege sets 48, this table 32 can be first queried to list all defined privileges 34–38. Applications 24 can also query this table 32 at runtime to get the definitions of the connected user's privileges and customize the application menu selections specifically suitable for that user (at client workstation 10). Privilege name and description are defined in a keywords table (not shown). Table III provides a exemplary set of system defined system administrator privilege definitions 34 and data access privilege definitions 36, showing privilege definition code 150 and corresponding example privilege definition names and privilege definition descriptions.

TABLE III

System Defined Privilege Definitions

| Priv Def Code 150 | PrivDefName* | PrivDefDesc* |
|---|---|---|
| | Sys Admin 34 | |
| 40 | SystemAdmin | The CM system administration privilege. |
| 41 | SystemQuery | The privilege to query CM system information. |
| 42 | SystemDefineUser | The privilege to create and update users. |
| 43 | SystemQueryUserPriv | The privilege to query other user's privileges. |
| 44 | SystemGrantUserPriv | The privilege to grant other user's privileges. |
| 45 | SystemDefineItemType | The privilege to query, create, update and delete Item Types and Attributes. |
| | Data Access 36 | |
| 120 | ItemSuperAccess | The privilege to bypass ACL check. |
| 121 | ItemSQLSelect | The privilege to select Items using SQL interface. |
| 122 | ItemTypeQuery | The privilege to query Item Type and Attribute definitions. |
| 123 | ItemQuery | The privilege to query Items. |
| 124 | ItemAdd | The privilege to create Items. |
| 125 | ItemSetUserAttr | The privilege to update Item's user-defined attribute values. |
| 126 | ItemSetSysAttr | The privilege to update Item's system-defined attribute values. |
| 127 | ItemDelete | The privilege to delete Items. |
| 128 | ItemMove | The privilege to move Items between Item Types. |
| 129 | ItemLinkTo | The privilege to heterogeneously link Items to other Items (make the Items foreign key children). |
| 130 | ItemLinked | The privilege to set Items to be heterogeneously linked by other Items (make the Items foreign key parents). |
| 131 | ItemOwn | The privilege to set Items to own a collection of Items. |
| 132 | ItemOwned | The privilege to set Items to be owned by other Items. |

*For illustration only. Name and description are defined in an NLS Keywords table (not shown).

Figure 9:
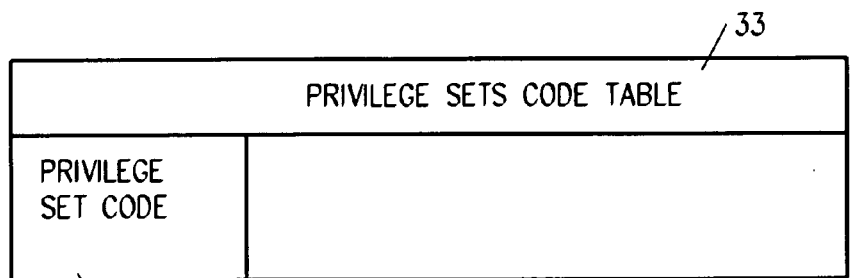
FIG. 9 illustrates the privilege sets code table 33 of FIG. 2.

Referring to FIG. 9, privilege sets code table 33 maintains privilege set definitions. A privilege set comprises an unlimited number of privileges. Each set is uniquely identified by a CM system 20 generated code, privilege set code 154. Its set member associations are stored in privilege sets table 48. Privilege set name and description are defined in a keywords table (not shown). Table IV gives an exemplary set of pre-configured privilege set codes 154 together with privilege sets names and descriptions.

TABLE IV

CM Pre-configured Privilege Set Codes

| Priv Set Code 154 | PrivSetName* | PrivSetDesc* |
|---|---|---|
| 1 | AllPrivSet | Users with this Privilege Set can perform all CM functions on all CM library entities 40. |
| 2 | NoPrivSet | Users with this Privilege Set cannot perform any CM functions on any CM library entities 40. |
| 3 | SystemAdminPrivSet | Users with this Privilege Set can perform all CM system administration and data modeling functions. |
| 4 | ItemAdminPrivSet | Users with this Privilege Set can perform all CM data modeling and Item 42 access functions. |
| 5 | ItemLoadPrivSet | Users with this Privilege Set can load Items 42 into CM library 40. |
| 6 | ItemReadPrivSet | Users with this Privilege Set can search and view CM Items 44. |
| 7 | ICMConnectPrivSet | Users with this privilege set can logon with a different UserID than the one used to Connect (Connect or database 30 UserID 130). |

*For illustration only. Name and description are defined in a keywords table (not shown).

Figure 10:
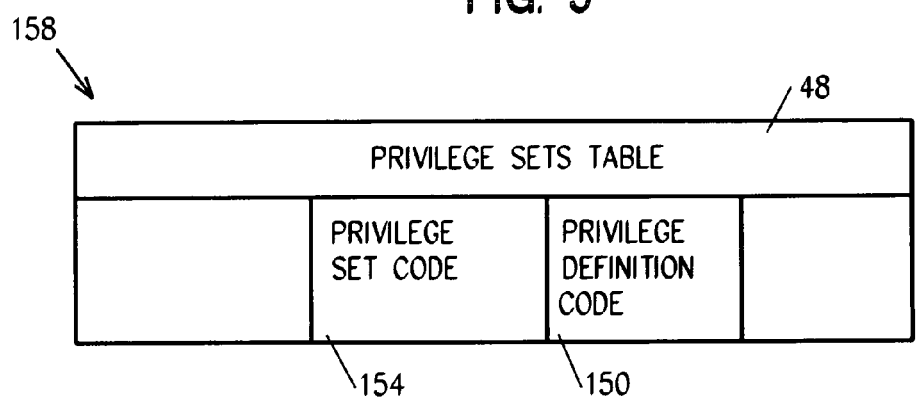
FIG. 10 illustrates the privilege sets table 48 of FIGS. 1 and 2.

Referring to FIG. 10, privilege sets table 48 maintains associations of CM privileges with the privilege sets. Rows 158 with the same privilege set code 154 form a privilege set. Rows 158 in this table 48 can only be deleted, not updated. Columns in privilege sets table 48 include privilege set code 154 and privilege definition code 150. Table V sets forth a collection of exemplary pre-configured privilege sets.

TABLE V

Pre-configured Privilege Sets

| Priv Set Code 154 | Priv Def Code 150 | PrivSetName* | PrivDefName* |
|---|---|---|---|
| 1 | 40 | AllPrivSet | SystemAdmin |
| 1 | 41 | | SystemQuery |
| 1 | 42 | | SystemDefineUser |
| 1 | 43 | | SystemQueryUserPriv |
| 1 | 44 | | SystemGrantUserPriv |
| 1 | 45 | | SystemDefineItemType |
| 1 | 120 | | ItemSuperAccess |
| 1 | 121 | | ItemSQLSelect |
| 1 | 122 | | ItemTypeQuery |
| 1 | 123 | | ItemQuery |
| 1 | 124 | | ItemAdd |
| 1 | 125 | | ItemSetUserAttr |
| 1 | 126 | | ItemSetSysAttr |
| 1 | 127 | | ItemDelete |
| 1 | 128 | | ItemMove |
| 1 | 129 | | ItemLinkTo |
| 1 | 130 | | ItemLinked |
| 1 | 131 | | ItemOwn |
| 1 | 132 | | ItemOwned |
| 3 | 40 | SystemAdminPrivSet | SystemAdmin |
| 3 | 45 | | SystemDefineItemType |
| 4 | 45 | ItemAdminPrivSet | SystemDefineItemType |
| 4 | 121 | | ItemSQLSelect |
| 4 | 122 | | ItemTypeQuery |
| 4 | 123 | | ItemQuery |
| 4 | 124 | | ItemAdd |
| 4 | 125 | | ItemSetUserAttr |
| 4 | 126 | | ItemSetSysAttr |
| 4 | 127 | | ItemDelete |
| 4 | 128 | | ItemMove |
| 4 | 129 | | ItemLinkTo |

TABLE V-continued

Pre-configured Privilege Sets

| Priv Set Code 154 | Priv Def Code 150 | PrivSetName* | PrivDefName* |
|---|---|---|---|
| 4 | 130 | | ItemLinked |
| 4 | 131 | | ItemOwn |
| 4 | 132 | | ItemOwned |
| 5 | 124 | ItemLoadPrivSet | ItemAdd |
| 5 | 128 | | ItemMove |
| 5 | 130 | | ItemLinked |
| 5 | 132 | | ItemOwned |
| 6 | 121 | ItemReadPrivSet | ItemSQLSelect |
| 6 | 123 | | ItemQuery |
| 7 | 1 | ICMConnectPrivSet | AllowConnectToLogon |

*For illustration only. Name and description are defined in the NLS Keywords table.

Figure 11:
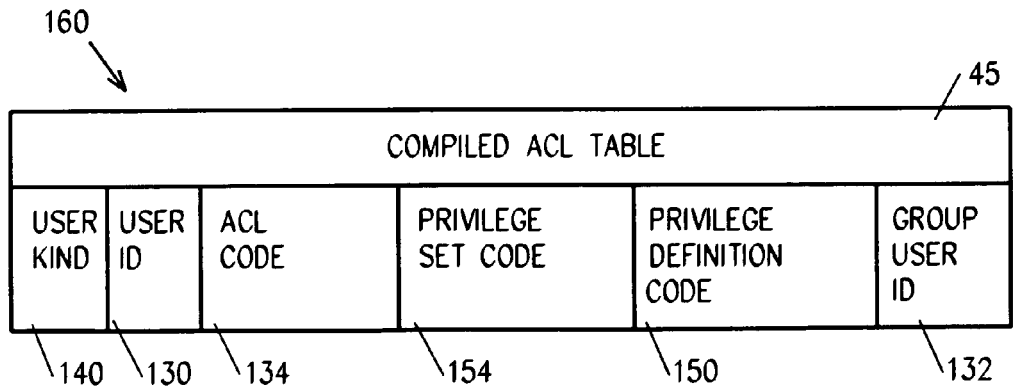
FIG. 11 illustrates the compiled ACL table 45 of FIG. 2.

Referring to FIG. 11, compiled ACL table 45 contains the compiled access control information. Columns in table 45 include user kind 140, user ID 130, ACL code 134, privilege set code 154, privilege definition code 150, and group user ID 132. User ID 130 contains only individual users. For each row 160 in compiled ACL table 45, privilege definition code 150 represents a single privilege for access to item 42. ACL code 134 is the access control list code. Privilege definition code 150 indicates the operation allowed for bound item 42. Privilege set code 154 is the privilege set code that the resolved privilege is derived from. This is a maintenance field, designed for incremental refresh on this table. For example, when a privilege set 158 is modified, rows 160 with the corresponding privilege set code 154 are affected, while other rows 160 are not. User ID 130 contains the authorized user's User ID. Group user ID 132 contains the group's User ID if this entry 160 is derived from an ACL rule for group. This column 132 provides a maintenance field, designed for incremental refresh. It contains null if the ACL rule user kind 140 is not for group. User kind 140 indicates which ACL rule type this row 160 is derived from: public, group or individual user.

Controlled Entities and System Entities

Figure 12:
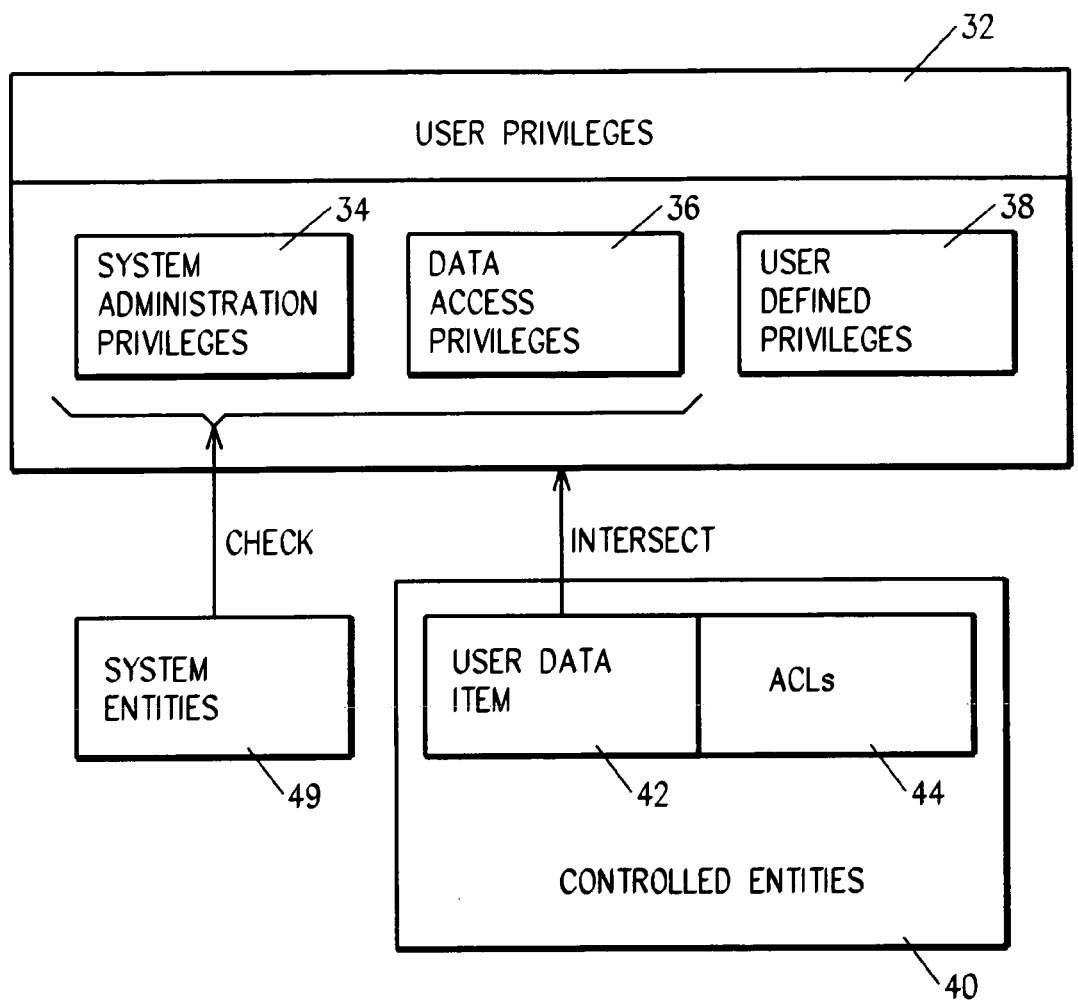
FIG. 12 further illustrates user privileges table 32 of FIG. 2, and its relationship to system entities and controlled entities.

Referring to FIG. 12, in the CM system, the controlled entities 40 are the user data 42. Whereas the traditional DBMS provides table-level access control, the CM provides finer-grained protection—row-level access control. Access to the CM user data 42 can be controlled at the levels of items, item types, or the entire library. These levels are correspondent to DBMS's row-, table- or system-level, respectively. The operation(s) applied on a controlled entity 40 is authorized by an ACL. Every CM Controlled entity 40 must be bound to an ACL 44. When performing an operation on a CM controlled entity 40, ACL 44 is enforced in addition to a check of user privileges 38.

CM system management entities, aka System Entities 49, such as system tables, views, indexes and stored procedures are not classified as controlled entities 42, and therefore have no ACL 44 associated with them. Access to CM system entities 49 is authorized only by the system administration 34 and data access privileges 36.

Configurable Binding of Access Control Lists

In accordance with the preferred embodiment of the invention, a system and method is provided for access control list (ACL) binding with the following levels:
0—At Item Type level (default)
1—At Item level
2—Mixed (Item & Item Type)
3—At the entire Library level Based on the ACL binding level, an ACL will be bound to the controlled entities. The ACL checking can be performed at the Item Type level, at the Item level, at the Mixed level, or at the entire Library level.

The binding level defines which ACL level is to be managed. ACL binding level column 104 in the system control table (ICMSTSysControl) 31 is used to control both the access of item types and items. In an exemplary embodiment, current valid values for binding level 104 are:

0—Item Type Level (Default)

An item type 161, 165 comprises one or more controlled entities (or, items) 40, such as component tables 162, 164. Each component table can have one (base) or more views 166, 168, 169. A group of views (in this example, 168, 169, one from each component table 162, 164) are included in an item type view 163. Other groups of views from component tables 162, 164 may be included in additional item type view 167.

For getItemType, the ACL code 133 of each item type view 163, 167 is checked. If any one of the item type views 163, 167 is granted, the item type 161 and the granted item type views 163, 167 are returned. If none of the item type views 163, 167 of the item type 161 is granted, the item type 161 and item type views 163, 167 are not returned.

For getItem, as long as the user can access the item type view 167, the user can access the item, in this case component tables 162, 164.

1—Item Level

For getItemType, all item types 161, 165 and item type views 163, 167 are returned.

For getItem, the ACL check is executed for each item 162, 164.

2—Mixed (Item & Item Type)

This binding level 104 allows a user to control some item types but not all item types.

ItemLevelACLFlag Column 172 in ItemTypeDefs Table 170

Item level ACL flag 172 indicates whether the binding of this item 161 to ACL 133 is configured at item level. Item level ACL flag 172 is used in conjunction with the system parameter ACLBindingLevel 104
(ICMSTSysControl.ACLBindingLevel)
when the latter (column 104) is set to 2 (mixed item and item type level), to configure the control level individually for each item type 161, 165. It (column 172) is not used if the ACLBindingLevel 104 is not set to mixed. The valid values are:
1—True, this item type 161 ACL binding is at item level 135, 137, 138.
0—False, this item type 161 ACL binding is at item type level 133.

ItemTypeACLCode 174 in ICMSTItemTypeDefs Table 170

This column 174 stores the ACL setting for the entire Item Type 161. It is used in two ways: (1) ACL binding enforcement or (2) default ACL resolution, depending on system configuration
(ICMSTSysControl.ACLBindingLevel,
ICMSTItemTypeDefs.ItemLevelACLFlag).

When item type ACL binding in item level ACL flag column 176 in item type definitions table 170 is configured at: (1) item type level, this value 174 is enforced so that all items 162, 164 in this type 161 are bound to this ACL 133; (2) item level, this value 174 is used as the default ACL 133. If ACL code 133 is not set, item type ACL code 174 is used. If the item type ACL binding in the item level ACL flag column 172 is at item type level:

For get item type, the ACL code 133 of each item type view 163, 167 of the item type 161 is checked. If any one of the item type views 163, 167 is granted, the item type 161 and the granted item type views 163, 167 are returned. If none of the item type views 163, 167 is granted, the item type 161 and item type view 163, 167 are not returned.

For get item, as long as the user can access the item type view 163, the user can access the item 162, 164.

If the item type ACL binding in item level ACL flag column 172 is at item level:

For get item type, the item type 161 and item type views 163, 167 are returned.

For get item, the ACL check 135, 137, 138 is executed for every single item 162, 164 in the item type 161.

3—Library Level

The ACL is a constant, defined in library ACL code column 106 in the IBMSTSysControl table 31.

For get item type, if the ACL 106 is granted, all item types 161, 165 and item type views 163, 167 are returned. Otherwise, no item type 161, 165 or item type view 163, 167 is returned.

For get item, all items 162, 164 are checked by the same ACL code 106.

Advantages over the Prior Art

It is an advantage of the invention that there is provided an improved system and method for managing access to entities.

It is a further advantage of the invention that there is provided an improved system and method for handling configurable binding of access control lists in a content management system.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. Method for authorizing access to a controlled entity by a user, comprising:
   binding an access control list (ACL) to each said controlled entity to enforce an ACL binding level selectively at item type, item, mixed, and library level;
   responsive to said ACL binding level, performing ACL checking for authorizing access to said controlled entity by said user;
   said item type comprising one or more component items with each component item having one or more item views which together form an item type view;
   configuring ACL binding control level individually for each said item type selectively to item control level or item type control level; and responsive to said mixed level,
   for said item types configured to said item type control level, checking said ACL for said item type to selectively grant access to said item type view;
   for a get item type request, returning said item type and said item type view for an item type view granted said access; for a get item request for an item in said item type, enabling access to said item provided said access is granted to said item type view; and
   for said item types configured to said item control level, for a get item type request, returning said item type and said item type views; and for a get item request, executing said ACL check for each said item in said item type.

2. Method for authorizing access to a controlled entity by a user, comprising:
   binding an access control list (ACL) to each said controlled entity to enforce an ACL binding level selectively at item type item, mixed, and library level; and
   responsive to said ACL binding level, performing ACL checking for authorizing access to said controlled entity by said user;
   said item type comprising one or more component items with each component item having one or more item views which together form an item type view;
   specifying for said user a set of user privileges;
   intersecting said ACL and said set of user privileges to authorize said access;
   providing a library level ACL;
   configuring ACL binding control level individually for each said item type selectively to item control level or item type control level;
   responsive to said item type level:
      checking said ACL for each said item type for selectively granting access for each said item type to a corresponding item type view;

for a get item type request, returning said item type and said item type view for each said item type for which said corresponding item type view is granted; and for a get item request, enabling access to said items corresponding to said item type view for which said access is granted;

responsive to said item level:

for a get item type request, returning all said item types and item type views; and for a get item request, checking said ACL for said item for selectively granting access to said item;

responsive to said mixed level, for said item types configured to said item type control level, checking said ACL for said item type to selectively grant access to said item type view; for a get item type request, returning said item type and said item type view for an item type view granted said access; and for a get item request for an item in said item type, enabling access to said item provided said access is granted to said item type view; and for said item types configured to said item control level, for a get item type request, returning said item type and said item type views; and for a get item request, executing said ACL check for each said item in said item type; and responsive to said library level, for a get item type request, checking said library level ACL to selectively grant access to said library and, responsive to said access being granted, returning all said item types and item type views; and for a get item request, checking said library level ACL to selectively grant access to said item.

3. System for authorizing access to a controlled entity by a user, comprising:

binding level control indicia selectively binding an access control list (ACL) to said controlled entity to enforce an ACL binding level selectively at item type, item, mixed, and library binding level;

a content manager responsive to said binding level for performing ACL checking for authorizing access to said controlled entity by said user;

said item type comprising one or more component items with each component item having one or more item views which together form an item type view;

said binding level control indicia configuring ACL binding control level individually for each said item type selectively to item control level or item type control level; and said content manager responsive to said mixed level; for said item types configured to said item type control level, checking said ACL for said item type to selectively grant access to said item type view; for a get item type request, returning said item type and said item type view for an item type view granted said access; for a get item request for an item in said item type, enabling access to said item provided said access is granted to said item type view; and for said item types configured to said item control level, for a get item type request, returning said item type and said item type views; and for a get item request, executing said ACL check for each said item in said item type.

4. A program storage device readable by a machine, tangibly embodying a program of instructions executable by a machine to perform a method for authorizing access to a controlled entity by a user, according to a method comprising:

binding an access control list (ACL) to said controlled entity to enforce an ACL binding level selectively at item type, item, mixed, and library level;

responsive to said ACL binding level, performing ACL checking for authorizing access to said controlled entity by said user;

said item type comprising one or more component items with each component item having one or more item views which together form an item type view;

specifying for said user a set of user privileges;

intersecting said ACL and said set of user privileges to authorize said access;

providing a library level ACL;

configuring ACL binding control level individually for each said item type selectively to item control level or item type control level;

responsive to said item type level:

checking said ACL for each said item type for selectively granting access for each said item type to a corresponding item type view;

for a get item type request, returning said item type and said item type view for each said item type for which said corresponding item type view is granted; and for a get item request, enabling access to said items corresponding to said item type view for which said access is granted;

responsive to said item level:

for a get item type request, returning all said item types and item type views; and for a get item request, checking said ACL for said item for selectively granting access to said item;

responsive to said mixed level, for said item types configured to said item type control level, checking said ACL for said item type to selectively grant access to said item type view; for a get item type request, returning said item type and said item type view for an item type view granted said access; and for a get item request for an item in said item type, enabling access to said item provided said access is granted to said item type view; and for said item types configured to said item control level, for a get item type request, returning said item type and said item type views; and for a get item request, executing said ACL check for each said item in said item type; and responsive to said library level, for a get item type request, checking said library level ACL to selectively grant access to said library and, responsive to said access being granted, returning all said item types and item type views; and for a get item request, checking said library level ACL to selectively grant access to said item.

* * * * *